Jan. 21, 1941. J. L. BIRD ET AL 2,229,036
ELECTRODE FOR SEA WATER DETECTION
Filed July 20, 1937
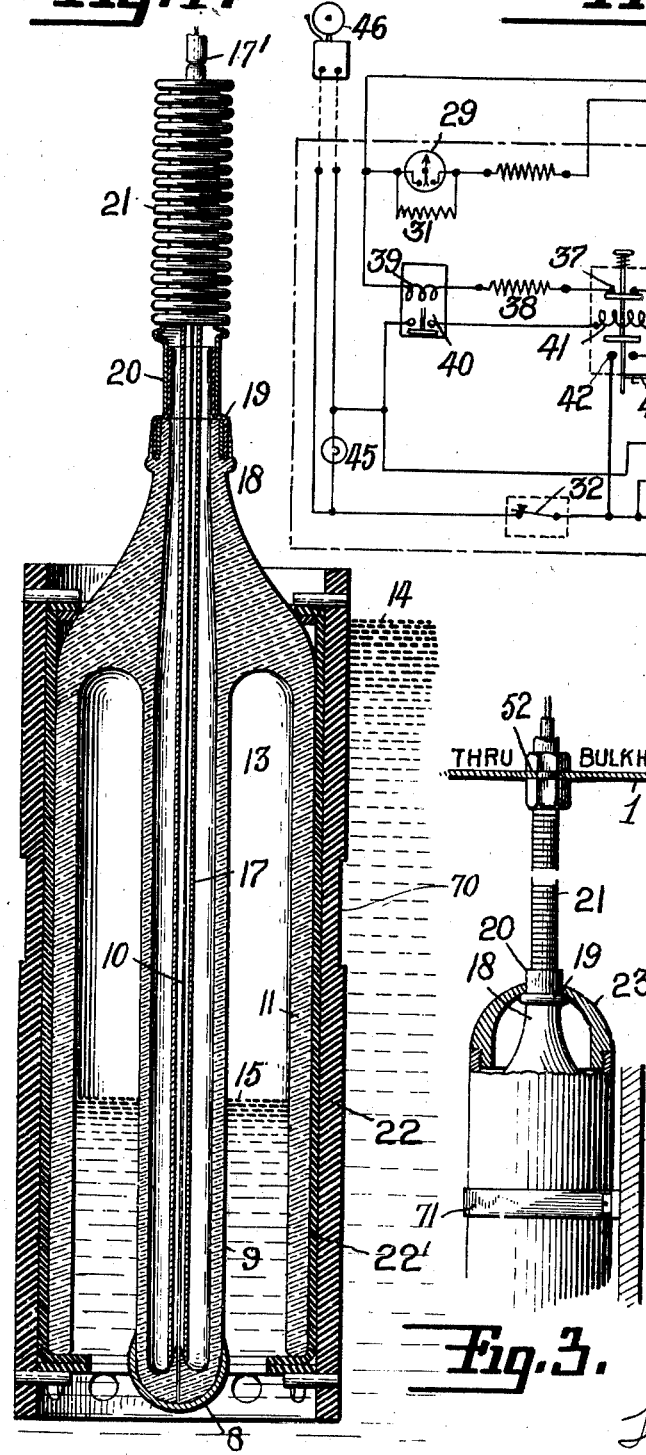
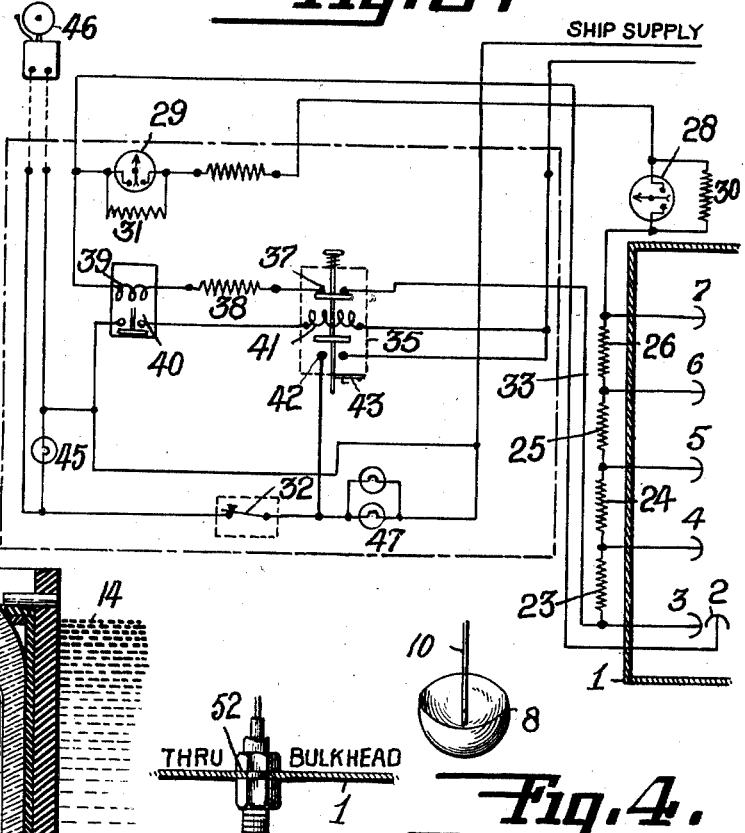
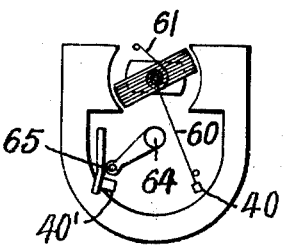
INVENTORS
JOHN L. BIRD,
FREDERICK S. HODGMAN
HERBERT S. POLIN
BY Herbert H. Thompson
THEIR ATTORNEY.

Patented Jan. 21, 1941

2,229,036

UNITED STATES PATENT OFFICE 2,229,036

ELECTRODE FOR SEA WATER DETECTION

John L. Bird and Frederick S. Hodgman, Glen Rock, N. J., and Herbert S. Polin, New York, N. Y., assignors, by direct and mesne assignments, to Harry A. Furman, Schenectady, N. Y.

Application July 20, 1937, Serial No. 154,542

5 Claims. (Cl. 136—103)

This invention relates to electrical indicating devices and, more particularly, to apparatus for remotely indicating the condition and sea water content of water-tight bulkheads or compartments on ships.

The invention is based on the well understood principle that when a pair of electrodes, which are electro-potentially dissimilar, for example, composed respectively of dissimlar metals such as an aluminum or silver electrode paired with a copper electrode, or other electric material, as carbon or cadmium or the like, are immersed in an electrically conducting solution or electrolyte, such as sea water, a potential difference will be established between them of a magnitude dependent on the particular electrodes selected. The arrangement thus constitutes an electrolytic cell generating a voltage which may be employed to actuate a suitable indicating device such as a meter connected between the electrodes.

More particularly, our invention relates to an improvement in the remote indicating system for which application for letters patent was filed by Herbert S. Polin and Francis B. Stoddert on August 14, 1935, Serial No. 36,128, the present invention relating to the construction of the electrodes themselves and the mounting thereof.

In such systems it has been found extremely difficult to maintain the high resistance necessary under normal conditions between the electrode and the metal hull of the ship or, in other words, the ship's ground. With electrodes secured to ordinary insulators, if the latter once become wetted with dirty sea water, a film is usually formed thereover which provides a relatively low leakage resistance to ground after the water leaves the electrode, that is, after the water in the compartment has gone down, so that the indicators fail to show correctly the recession of water in the compartment and thereafter become inoperative. The maintenance of a high insulation resistance to ground when the electrode is not submerged is hence of the utmost importance, since the circuit resistances employed in such a system are high—of the order of several thousand ohms—and the currents employed to actuate the depth indicating meters are very low—of the order of 50 micro-amperes.

Referring to the drawing, illustrating the preferred form of our invention,

Fig. 1 is a vertical section of an electrode and insulating mounting therefor, as employed in the ship's compartment.

Fig. 2 is an elementary wiring diagram of the indicating alarm system used in connection with a series of such electrodes.

Fig. 3 is a sectional detail showing a modified form of cap or shield for the electrode and insulator of Fig. 1.

Fig. 4 is a perspective view showing the appearance of the electrode proper if broken off the glass tube to the end of which it is normally secured.

Fig. 5 is a diagrammatic view of a preferred form of lock in relay for the alarm circuit.

According to this system, there is disposed within each compartment of the ship, one of which is shown at 1, an electrode 2 of one type of metal preferably silver, which acts as a common electrode for a series of electrodes 3, 4, 5, 6 and 7 in regularly spaced by volume sequence up the wall of the compartment and composed of a different type of metal from that of the electrode 2, such as cadmium, and it is to the construction of these respective electrodes to which this invention particularly relates.

Preferably, each electrode is formed as a small metal cap 8 which is intimately formed on or united with the bottom of an insulating tube 9 of glass or other vitreous insulating material. Preferably, we employ a heat resisting glass for this purpose, such as Pyrex. Preferably, said cap or coating may be applied by casting the metal around the glass or sputtering it on by the "Schoop" process. The end of said tube also has molded therein a tungsten wire 10 which projects a short distance through the end and is fused to the cap. Fig. 4 shows the cap and wire as they would appear if the glass tubing were broken off the same. The preferred method of construction is to first draw tube 9, then to seal the end of wire 10 in the end thereof with a small end projecting, and then to sputter a thin coating of metal thereon to which said wire is bonded, after which a heavier cap of the metal is cast over this coating. Finally, we prefer to coat the silver of electrode 2 with a depolarizing agent, such as a layer of silver chloride, which is applied by fusing silver chloride powder to the silver electrode.

Preferably, the tube 9 lies within a bottle shaped container 11, preferably formed of the same material, such as Pyrex glass, as the tube 9 and drawn together to form a tapered top. Thus, there is provided an air space between the outer wall of the tube 9 and the inner walls of the outer tube or container 11 which is never entirely wetted by sea water no matter how high the water should rise in the compartment, due to the air trapped within this annular space 13. In the drawing, the water is shown as having risen on the outside to the level 14, while inside it has only risen to the level 15.

The wire 10 may also be enclosed in a small bore insulating tube 17 which passes up through the neck 18 of the bottle. To the top of said neck is fused a metal ferrule 19 preferably made of copper, the glass of the bottle being fused around the ferrule to form a water-tight seal under pressure, known in the trade as a "Housekeeper seal". Secured to said ferrule is a copper sleeve 20 pressed thereover, the upper portion of which is corrugated to form a long, flexible, water-tight tubing 21 which is connected with a water-tight gland 52 at the bulkhead 1. Through this flexible tubing the insulating cover for the wire 10 may be formed in short sections, as indicated at 17', to give flexibility. The entire bottle may be enclosed within a Bakelite cylinder 22, with a cushioning rubber lining 22' to shock mount the glass insulator against gunfire and other jars. The flexible tubing 21 prevents shocks from reaching the insulator from the top of the bulkhead. The Bakelite cylinder 22 has a circular recess 70 into which is fitted a mounting strap 71, by means of which the cylinder is mounted against the bulkhead. The flexible tubing 21 may be of any desired length sufficient to reach the ceiling of the compartment, or copper tubing may be substituted for part of its length.

As shown in Fig. 2, the electrodes 3, 4, 5, 6 and 7 are connected to a series of resistances 23, 24, 25 and 26, and thence to one or more microammeters 28 and 29 which may be shunted by resistances 30, 31. It will be obvious, therefore, that as the water rises to cover the lower electrodes 2 and 3, the meter readings will be low since the small E. M. F. generated by the cell will have to pass the successive resistances 23, 24, 25 and 26. If the water continues to rise, the resistances will be successively short-circuited by the sea water, so that the meter reading will rise to give the approximate depth of the water in the compartment.

Preferably, also, an alarm system is provided to ring an alarm when the water covers the lowest electrode. This system is so arranged that a bell will ring or a light light, or both, at that time and the alarm will continue to ring until manually thrown out, as by a switch 32. For this purpose, a wire 33 is led from the cell 3 around all of the aforesaid resistances directly to relay 35. Cell current will then pass across bridge contacts 37 through resistance 38 and through relay coil 39 to energize it and close contacts 40 to pass the supply current to relay coil 41 of relay 35. This will open contacts 37, close contact 42, and lock the alarm in by the aid of the spring catch 43. If desired, two sets of lamps may be employed, one of which, 45, is in the same circuit as the alarm bell 46, so that it remains lighted until the switch 32 is opened, while the others, 47, stay lighted to indicate the compartment location. These remain lighted until latch 43 is released when resetting the equipment after the water leaves the compartment.

The preferred construction of relay 39 is shown in Fig. 5, which shows it of the sensitive or self-energizing type having a pivoted arm 60 which is caused to move through an arc against the action of datum spring 61, and which carries attached to the swinging arm a small magnetic contact 40 which at the extreme of its movement is attracted and held by a permanent magnet 40'. It is thus necessary to reset this relay by hand or otherwise after it has performed its function of energizing solenoid 41, by turning knob 64 having a pin 65 attached thereto, which contacts with arm 60. It will be noted that the sole function of relay 39 is to energize solenoid 41 of relay 35 through contacts 40. Having done so, relay 35 remains latched mechanically and relay 39 may be manually opened by breaking away the magnetic contact from its magnet.

Relay 35 will now remain latched throughout any failure of ship's power or restoration thereof, the only indication of such loss and restoration of power being the fact that lamps 47 will blink off and on (assuming the alarm switch 32 to have been opened). Meters 28 and 29 will indicate the correct depth of water regardless of whether ship's electrical power supply is on or not.

When the meter 29 indicates "empty," relay 35 may be unlatched, opening contacts 42 and causing lamps 47 to go out. If the compartment is really empty (i. e., electrodes 2 and 3 not immersed), relay 35 will remain open. If water is still present, however, regardless of empty indication on meter 29, solenoid 39 becomes immediately re-energized and closes contacts 40, energizing, in turn, solenoid 41 and causing relay 35 to close contacts 42 and again latch in mechanically.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An electrode for use in an indicating system for showing the presence of sea water in a compartment, comprising an inner and an outer non-metallic tube, said tubes being closed at one end, the outer tube being open at the other end and the inner tube sealed at the same end, a metallic element mounted on the sealed end of the inner tube, and an electrical conductor in the inner tube passing through said sealed end and bonded to said element.

2. An electrode for use in an indicating system for showing the presence of sea water, as claimed in claim 1, in which said metallic element is in the form of a metal cap sputtered on the sealed end of the inner tube.

3. An electrode for use in a system for indicating the presence of sea water in a compartment, comprising an insulator having a tubular inner portion and a bell shaped outer portion, said portions being integral at the top end only so as to enclose between them a substantially annular air space, a metallic element mounted on the lower end of said tubular inner portion, and an electrical conductor passing through said tubular portion and connected to said element.

4. An electrode for use in a system for indicating the presence of sea water in a compartment, comprising a substantially tubular insulator sealed at least at its exposed end and mounted in said compartment, metallic means carried by said insulator for electrically contacting the sea water, means for conducting current from said metallic means through said insulator to a point outside of said compartment, and means for maintaining a high insulation resistance between said conducting means and the sea water or other bodies at substantially ground potential, comprising an outer non-metallic cylindrical shield, the space between said insulator and said shield being closed at one end only, whereby air is trapped within a portion of said space and prevents the wetting of the boundary surfaces thereof.

5. In an electrode for a voltaic cell, an insulating support having inner and outer walls of high insulation resistance in the presence of the electrolyte of said cell, the spacing of said walls being but a small fraction of the height thereof, an electrode element carried by the lower end of said inner wall, and a connecting wall joining the upper portions of said inner and outer walls so that upon immersion of said electrode in the electrolyte there is provided a pocket in which air is trapped between said inner and outer walls extending well above said electrode element, said air preventing a substantial portion of the wall surface of said support from being wetted by the electrolyte.

JOHN L. BIRD.
FREDERICK S. HODGMAN.
HERBERT S. POLIN.